United States Patent [19]

Grosseau

[11] 3,840,045
[45] Oct. 8, 1974

[54] ELECTRICALLY OPERATED VALVES OR DISTRIBUTORS FOR CONTROLLING FLUID UNDER PRESSURE

[75] Inventor: Albert Grosseau, Chaville, France

[73] Assignee: S.A. Automobiles Citroen, Paris, France

[22] Filed: June 6, 1972

[21] Appl. No.: 260,317

[30] Foreign Application Priority Data
June 9, 1971 France .............................. 71.21415

[52] U.S. Cl. .......................... 137/495, 137/625.61
[51] Int. Cl. ........................................... F16k 31/04
[58] Field of Search ....................... 137/495, 625.61

[56] References Cited
UNITED STATES PATENTS 3,179,123  4/1965  Kowalski et al. .................. 137/495
3,307,824  3/1967  Weisheit ....................... 137/487.5 X
3,401,711  9/1968  Kubilos ....................... 137/625.61 X
3,450,153  6/1969  Hildebrandt et al. ......... 137/487.5 X
3,454,037  7/1969  Grace et al. ..................... 137/487.5
3,464,438  9/1969  Maurer ............................ 137/487.5
3,738,609  6/1973  Divigard ............................ 251/129

FOREIGN PATENTS OR APPLICATIONS 243,930   12/1965  Austria .......................... 137/625.65
1,240,632  8/1960  France ........................... 137/625.65

Primary Examiner—Henry T. Klinksiek
Attorney, Agent, or Firm—Eyre, Mann & Lucas

[57] ABSTRACT

An electrically operated valve or distributor comprises a slide member coupled to an electrodynamic motor. A pulsed current, dependent on a control signal is fed to the windings of the motor. The pulses can have a fixed frequency and variable width, or a fixed width and a variable frequency.

24 Claims, 5 Drawing Figures

ELECTRICALLY OPERATED VALVES OR DISTRIBUTORS FOR CONTROLLING FLUID UNDER PRESSURE

FIELD OF THE INVENTION

The present invention relates to pressurised-fluid control assemblies, that is valves or distributors.

SUMMARY OF THE INVENTION

According to the present invention, there is provided in a pressurised-fluid control assembly, a slidable distribution member, means defining an outlet from the assembly, means subjecting the distribution member to an axial force governed by the pressure at the outlet of the assembly, and an electrodynamic motor having a winding, said winding being directly connected to the distribution member and being fed with a pulsed current governed by a control signal.

The winding integrates the pulsed signal and is subjected to a mean force equal to that which would be produced by a continuous current equal in strength to the mean value of the pulsed current. There remains, however, residual modulation, which causes micro-vibrations in the distribution member, so that this is prevented from sticking and precision is improved.

The pulsed current can be made up of square pulses of constant frequency but varying in width according to a control signal, or of pulses of constant width and varying in frequency according to the control signal. In the first case, the assembly can incorporate means for producing a sawtooth voltage, a comparator for comparing the value of that voltage to the control voltage, and a bistable flip-flop so connected to the comparator as to trip when the difference between the value of the control voltage and that of the sawtooth voltage changes sign and having its output connected to the winding.

In the second case, the assembly can comprise a voltage/frequency converter of normal type.

BRIEF DESCRIPTION OF THE DRAWINGS

An embodiment of the invention will now be described, by way of example only, with reference to the accompanying diagrammatic drawings, in which.

DESCRIPTION OF THE PREFERRED EMBODIMENT

Figure 1:
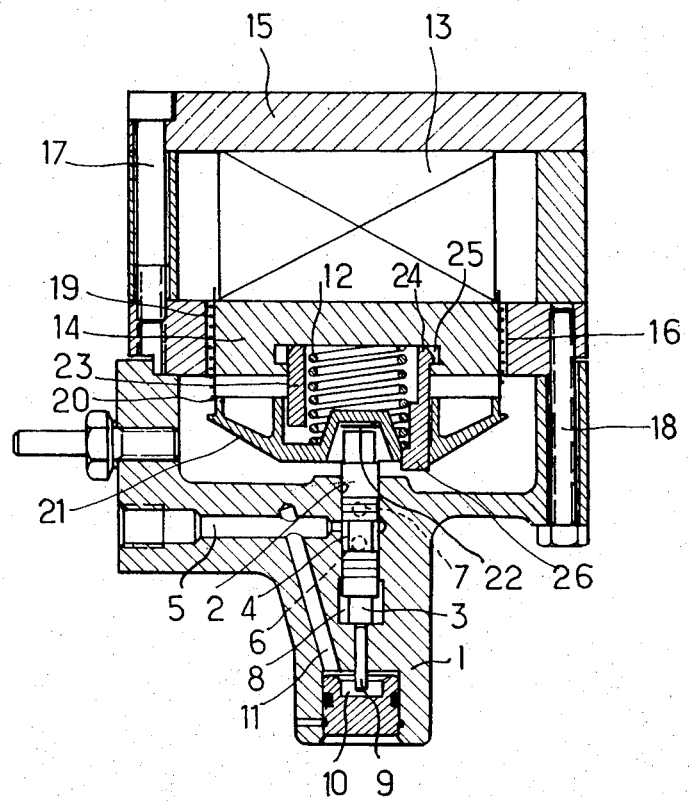
FIG. 1 is an axial section of a valve in accordance with the invention.

As shown in FIG. 1, an electrically operated valve comprises a distributor comprising a body 1 containing a bore 2 in which a slidable distribution member 3 (hereinafter referred to as a slide) is mounted. The slide 3 contains an annular groove 4 which enables a passage 5, connected to an associated fluid-actuated device, to be placed in communication either with a passage 6, connected to a source of pressurised fluid at a pressure (P), or with a vent or outlet passage 7; the source of pressurised fluid can comprise a hydraulic accumulator charged by a pump. When the slide 3 is moved upwards from the position shown in FIG. 1, the passage 5 is gradually placed in greater communication with the passage 7, while the communication between the passage 5 and the passage 6 is gradually reduced; the result is a fall in pressure in the associated device.

One end of the bore 2 opens into a chamber 8 through the end of which one end portion of a thrust member or pin 9 can pass, the other end portion of the pin 9 being located in a chamber 10 to a passage 11 provides communication between the chamber 10 and the passage 5.

When an axial force (F) is applied to that end of the slide 3 which is remote from the chamber 10, the slide 3 moves downwards, towards the position it occupies in FIG. 1; however the pressure ($P_u$) then exerted in the associated device (and thus in the chamber 10) acts to move the pin 9 upwards, so that the pin 9 bears against the slide 3 with a force equal to $s \cdot P_u$, $s$ being the cross-sectional area of the pin 9. The slide 3 ultimately assumes an equilibrium position in which the two forces F and $s \cdot P_u$ are equal; thus the value of the pressure $P_u$ is $F/s$.

In the present case, the force F is produced by a spring 12, which is such as to be dominant, taking into account the diameter of the pin 9, even at maximum pressure, and to maintain the slide 3 in the position shown in the drawing, in which it bears against the end wall of the chamber 8. The associated device is thus normally charged with fluid at a pressure P.

The slide 3 can be moved by an electrodynamic motor in an upward direction against the bias of the spring 12.

The motor comprises a permanent magnet 13 mounted between a pole piece 14 and a pot-shaped magnetic yoke 15, which, in conjunction with the pole piece 14, defines an annular air gap 16. The yoke 15, which is formed from three parts joined together by two bolts 17, is fixed by bolts 18 to the distributor body 1.

A winding 19, supported by a core 20 is located within the gap 16. The core 20 is fitted over a cup 21 the bottom surface of which faces the slide 3, with which it makes contact through an elastic washer 22, the purpose of which is to absorb vibrations. The spring 12 is interposed between the other surface of the cup and the pole piece 14. The cup 21 is mounted with freedom to slide on a hub 23, one end portion of which carries hook-shaped projections 24 which engage in an annular groove 25 in the pole piece 14. The other end portion of the hub 23 carries projections 26 engaged in openings in the cup 21.

In the absence of current in the winding 19, a maximum fluid pressure equal to P will exist in the associated device, as has been stated before. However, when current is passed through the winding 19 in the appropriate direction, the winding 19, together with the cup 21 is urged to move axially upwards in FIG. 1. The force exerted on the cup 21 opposes the action of the spring 12 so that, beyond a certain mean voltage in the winding 19, this spring 12 no longer dominates and the slide 3 moves upwards; the pressure in the associated device falls by an amount proportional to the variation in the force exerted on the cup by the winding 19.

The current flowing in the winding 19 is not continuous however, but is a pulsed current having the same mean voltage.

Figure 2:
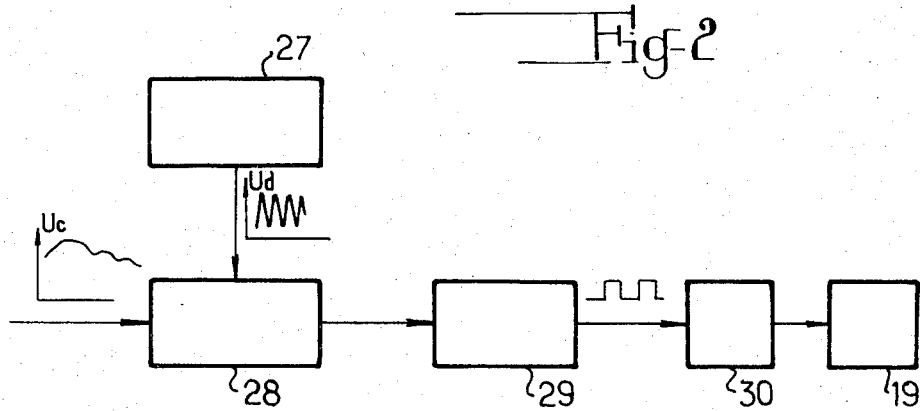
FIG. 2 is a block diagram of means for energising a winding of the valve shown in FIG. 1.
Figure 3:
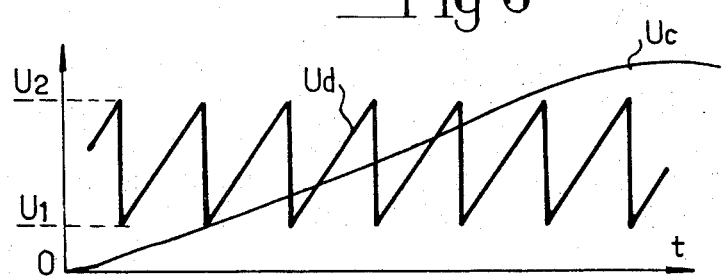
FIG. 3 is a graph showing a control voltage and a sawtooth voltage.
Figure 4:
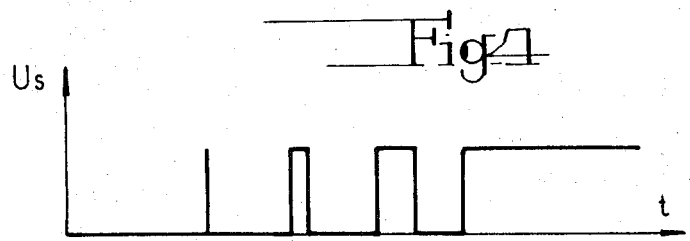
FIG. 4 shows the pulses obtained when the control voltage varies as shown in FIG. 3.

As shown in FIGS. 2 to 4, a device for providing such a pulsed current, comprises a sawtooth voltage generator 27, supplying a voltage of which the instantaneous value $U_d$ varies between $U_1$ and $U_2$. A comparator 28, has one input connected to the sawtooth generator 27, while its other input receives a control voltage $U_c$. The output of the comparator is connected to the input of a bistable flip-flop 29, the output of which is connected to the winding 19 through an amplifier 30. The flip-flop supplies a voltage $U_s$ when $U_d$ is less than $U_c$ and zero voltage in the contrary case, that is to say when $U_d$ is greater than $U_c$.

When the voltage $U_c$ is less than $U_1$, the voltage at the flip-flop output is zero. When it is greater than $U_2$, the value of the flip-flop output voltage is $U_s$. When the voltage $U_c$ lies between $U_1$ and $U_2$, the voltage $U_d$ is less than $U_c$ during an initial portion of the cycle, — the higher the value of $U_c$, the longer is the said portion; it is greater than $U_c$ during the remainder of the cycle (FIG. 3). During the initial portion of the cycle, the difference $U_c - U_d$ is positive and the flip-flop 29 supplies a pulse of voltage $U_s$ (FIG. 4); this pulse ceases when the voltage $U_d$ attains the value $U_c$. It will thus be seen that the pulses emitted by the flip-flop 29 are fixed frequency, which is that of the sawtooth generator 27, but vary in width according to the value of the control voltage $U_c$.

These pulses are, in essence, integrated in the winding 19 and the valve supplies a mean pressure, the difference between which and the maximum value is proportional to the square top widths, i.e. is linked linearly with the value of the control voltage; the limit value $U_1$ may be zero, in which case this pressure difference is proportional to the value of the control voltage. However, there remains some modulation, which causes micro-vibration of the slide 3. The prevents the slide from sticking in the body 1, as might otherwise occur if it were immobilised in a particular position. Moreover, such vibrations create a fictitious overlap between the high-pressure intake and the vent passage, which increases the precision of control.

Figure 5:
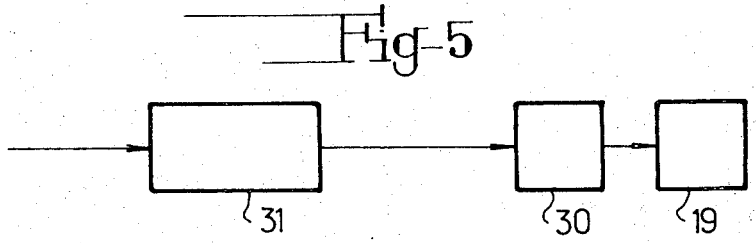
FIG. 5 shows another form of means for energising the winding.

In the form shown in FIG. 5, the control voltage $U_c$ is applied to a voltage/frequency converter 31, which provides pulses of fixed width but with a frequency governed by the value of the voltage $U_c$. As before, these pulses, amplified at 30, energise the winding 19. The mode of operation in this form is identical to that of FIG. 2 and the pressure applied to the associated device, in relation to the maximum pressure, has a difference proportional to the pulse frequency, that is to say to the value of the control voltage.

The moving parts of the valve can be arranged to work in oil, which introduces a damping action, making it possible to work with low pulse frequencies of the order of 20 cycles per second, for example.

The assembly particularly described supplies a pressure, the value or variation of which is proportional to the mean voltage of the control signal; the precision of the correlation between pressure and control signal is improved in the assembly described in relation to previously proposed assemblies.

What is claimed is:

1. A pressurized fluid control assembly, which comprises:
    a. a first passage for communicating with a source of pressurized fluid;
    b. a second passage for communicating with a fluid actuated device;
    c. a vent passage;
    d. distribution means for proportionally communicating said first and vent passages alternatively with said second passage; and
    e. means comprising an electrodynamic motor having a movable winding and operative to effect movement of said distribution means to proportionally communicate said passages proportionally responsive to a pulsed current control signal which is applied to said winding.

2. A pressurized fluid control assembly according to claim 1 further comprising a bore communicating with said first and second and vent passages, said distribution means being axially disposed in said bore.

3. A pressurized fluid control assembly according to claim 2 further comprising:
    a. first means for exerting a first axial force on said distribution means controlled by the pressure at said second passage; and
    b. said electro-dynamic motor being operative to exert a second axial force on said distribution means responsive to said control signal.

4. A pressurized fluid control assembly according to claim 3 wherein said first means comprises:
    a. a chamber in communication with said second passage; and
    b. a thrust member of smaller section than said distribution means, one end of said member being received in said chamber and another end of said member bearing against and being movable with said distribution means.

5. A pressurized fluid control assembly according to claim 4 wherein said another end of said member bears against said distribution member.

6. A pressurized fluid control assembly according to claim 1 wherein said first means and said motor exert said first and second axial forces on said distribution means in the same direction, and said pressurized fluid control assembly further comprises second means for exerting a third axial force on said distribution means opposed to said first and second axial forces.

7. A pressurized fluid control assembly according to claim 6 wherein said second means comprises a spring.

8. A pressurized fluid control assembly according to claim 7 wherein said spring exerting said third axial force is operative to normally overcome said first means exerting said first axial force under all operating pressures present at said second passage, and said motor exerting said second axial force is operative to overcome said spring exerting said third axial force when said control signal applied to said winding attains a predetermined value.

9. A pressurized fluid control system, which comprises:
    a. a fluid control assembly operative to proportion fluid pressure in response to a pulsed current control signal; and
    b. means operative to generate said pulsed current control signal from and proportional to a first control signal, which comprises:
        i. first means operative to generate a sawtooth signal; and ii. second means operative to receive said sawtooth signal and said first control signal and provide said pulsed current control signal.

10. A pressurized fluid control system according to claim 9 wherein said pulsed current control signal comprises pulses of substantially constant magnitude and interpulse periods having a magnitude of substantially zero value.

11. A pressurized fluid control system according to claim 10 wherein said pulsed current control signal comprises pulses of fixed frequency and varying width.

12. A pressurized fluid control system according to claim 10 wherein said pulsed current control signal comprises pulses of fixed width and varying frequency.

13. A pressurized fluid control system according to claim 9 wherein said second means is operative to receive said sawtooth signal and said first control signal and provide an output signal having a first value when the instantaneous value of said sawtooth signal exceeds that of said first control signal, and having a second value when the instantaneous value of said first control signal exceeds that of said sawtooth signal, and wherein said means operative to generate said pulsed current control signal further comprises third means connected to said second means and operative to receive said second means output signal and provide said pulsed current control signal.

14. A pressurized fluid control system according to claim 13 and wherein said third means includes bistable circuit means.

15. A pressurized fluid control system according to claim 14 wherein said bistable circuit means comprises a flip-flop circuit.

16. A pressurized fluid control system according to claim 9 wherein said fluid control assembly comprises:

a. a first passage for communicating with a source of pressurized fluid;
b. a second passage for communicating with a fluid actuated device;
c. a vent passage;
d. distribution means for proportionally communicating said first and vent passages alternatively with said second passage; and
e. means comprising an electro-dynamic motor having a movable winding and operative to effect movement of said distribution means to proportionally communicate said passages responsive to said pulsed current control signal which is applied to said winding.

17. A pressurized fluid control system according to claim 16 further comprising a bore communicating with said first, second and vent passages, said distribution means being axially disposed in said bore.

18. A pressurized fluid control system according to claim 17 further comprising:

a. first means for exerting a first axial force on said distribution means controlled by the pressure at said second passage; and
b. said electro-dynamic motor being operative to exert a second axial force on said distribution means responsive to said pulsed current control signal.

19. A pressurized fluid control system according to claim 18 wherein said first means and said motor exert said first and second axial forces on said distribution means in the same direction, and said pressurized fluid control assembly further comprises second means for exerting a third axial force on said distribution means opposed to said first and second axial forces.

20. A pressurized fluid control system according to claim 19 wherein said second means comprises a spring.

21. A pressurized fluid control system according to claim 20 wherein said spring exerting said third axial force is operative to normally overcome said first means exerting said first axial force under all operating pressures present at said second passage, and said motor exerting said second axial force is operative to overcome said spring exerting said third axial force when said first control signal applied to said winding attains a predetermined value.

22. A pressurized fluid control system according to claim 18 wherein said first means comprises:

a. a chamber in communication with said second passage; and
b. a thrust member of smaller section than said distribution means, one end of said member being received in said chamber and another end of said member bearing against and being movable with said distribution means.

23. A pressurized fluid control system according to claim 22 wherein said another end of said member bears against said distribution member.

24. A pressurized fluid control system, which comprises:

a. a fluid control assembly operative to proportion fluid pressure in response to a pulsed current control signal having a substantially constant pulse magnitude and an interpulse magnitude of substantially zero value; and
b. means operative to generate said pulsed current control signal from and proportional to a first control signal, which comprises:
  i. first means operative to generate a sawtooth signal; and
  ii. second means operative to receive said sawtooth signal and said first control signal and provide an output signal having a first value when the instantaneous value of said sawtooth signal exceeds that of said first control signal, and having a second value when the instantaneous value of said first control signal exceeds that of said sawtooth signal; and
  iii. third means connected to said second means and operative to receive said second means output signal and provide said pulsed current control signal.

* * * * *